2,954,378
DIOXAZINE DYESTUFFS

André Pugin and Meinrad Hürbin, Basel, Switzerland, assignors to J. R. Geigy A.-G., Basel, Switzerland No Drawing. Filed May 2, 1958, Ser. No. 732,448

Claims priority, application Switzerland May 10, 1957

6 Claims. (Cl. 260—246)

The present invention concerns new dyestuffs of the dioxazine series, a process for the production thereof, their use for the dyeing of organic material and, as industrial product, the material dyed with the new dyestuffs.

Diamino-triphendioxazine dyestuffs the amino groups of which are substituted by heterocyclic radicals containing nitrogen are already known. However, in these dyestuffs the hetero rings are bound to the amino groups by way of o-condensed benzene radicals. Also only dyestuffs which contain sulphonic acid groups have been suggested for use.

It has now been found that valuable violet, unsulphonated triphendioxazine dyestuffs are obtained if an N-triazinyl-p-phenylene diamine compound of the general Formula I

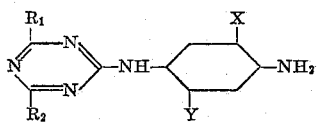

wherein:

$R_1$ and $R_2$ represent organic radicals possibly bound by way of nitrogen atoms to the triazinyl radical,
X represents hydrogen or an ether group, and
Y represents hydrogen, a low alkoxy radical or a mononuclear aralkoxy radical, is condensed with chloranil and simultaneously or subsequently the reaction product is subjected to conditions for forming the oxazine ring, the ring oxygen atom taking the position of X.

The dyestuffs according to the present invention correspond to the general Formula II

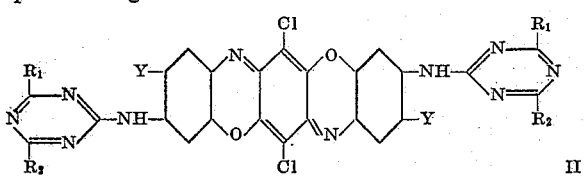

wherein $R_1$, $R_2$ and Y have the meanings given above.

The new unsulphonated dioxazine compounds are valuable pigment dyestuffs which are distinguished in particular by their remarkable fastness to migration and cross lacquering and by their good to very good fastness to light. Pigments which are particularly fast to migration are obtained if starting materials of the general Formula I are used, the benzene ring of which is substituted by an ether group in the o-position to the secondary amino group, for example by a methoxy, ethoxy, propyloxy or benzyloxy group.

The substituents $R_1$ and $R_2$ are identical or different radicals of the aliphatic, aromatic or heterocyclic series which are possibly bound to the triazine rings by way of nitrogen atoms. In valuable, fast end products, $R_1$ and $R_2$ represent mononuclear aryl, alkylamino, N.N-dialkylamino, mononuclear arylamino, morpholino and piperidino radicals, whereby phenylamino, chlorinated phenylamino and morpholino radicals are particularly preferred.

N-triazinyl-p-phenylendiamines of the general Formula I which are used in the present process as starting materials are for example as follows:

4-amino-2.5-dimethoxy-1-[4'.6'-bis-n-butylamino-1'.3'.5'-triazinyl-(2')-aminol]-benzene,
4 - amino-2.5-dimethyl - 1 - [4'.6'-bis-(di-n-butylamino)-1'.3'.5'-triazinyl-(2')-amino]-benzene,
4 - amino - 2.5 - dimethoxy - 1 - [4'.6'-bis-octadecylamino-1'.3'.5'-triazinyl-(2')-amino]-benzene,
4 - amino-2.5-dimethoxy-1-[4'.6'-bis-benzylamino-1'.3'.5'-triazinyl-(2')-amino]-benzene,
4 - amino - 2.5-diethoxy-1-[4'.6'-bis-phenylamino-1'.3'.5'-triazinyl-(2')-amino]-benzene,
4-amino-1-[4'.6'-bis-phenylamino-1'.3'.5'-triazinyl - (2')-amino]-benzene,
4-amino-5-methoxy-1-[4'.6'-bis-phenylamino-1'.3'.5' - triazinyl-(2')-amino]-benzene,
4 - amino - 2.5 - dimethoxy-1-[4'.6'-bis-(2''-methylphenylamino)-1'.3'.5'-triazinyl-(2')-amino]-benzene and the corresponding
3''- and 4''-methylphenylamino derivatives,
4 - amino-2.5-dimethoxy-1-[4'.6'-bis - (2''.4'' - dimethylphenylamino)-1'.3'.5'-triazinyl-(2')-amino]-benzene,
4 - amino - 2.5-dimethoxy-1-[4'.6'-bis(2'' - chlorophenylamino) - 1'.3'.5'-triazinyl-(2')-amino]-benzene and the corresponding
3''- and 4''-chlorophenylamino derivatives,
4 - amino-1-[4'.6'-bis-(2''-chlorophenylamino)-1'.3'.5'-triazinyl-(2')-amino]-benzene,
4 - amino - 2.5 - dimethoxy-1-[4'.6'-bis - (2''.4''-dichlorophenylamino)-1'.3'.5'-triazinyl-(2') - amino] - benzene and the corresponding
2''.5''- and 3''.4''-dichlorophenylamino derivatives,
4-amino-2.5-dimethoxy-1-[4'.6'-bis-(2'' - methoxyphenylamino)-1'.3'.5'-triazinyl-(2')-amino]-benzene,
4-amino-2.5-dimethoxy-1-[4'.6'-bis - (2''.4'' - dimethoxyphenylamino)-1'.3'.5'-triazinyl-(2')-amino]-benzene,
4-amino-2.5-dimethoxy-1-[4'-(4''-chlorophenylamino)-6'-(4''-methoxyphenylamino)-1'.3'.5'-triazinyl-(2') - amino]-benzene,
4-amino-1-[4'.6'-bis-phenyl-1'.3'.5'-triazinyl-(2')-amino]-benzene,
4 - amino - 2.5-dimethoxy-1-[4'.6'-bis-phenyl-1'.3'.5' - triazinyl-(2')-amino]-benzene,
4-amino-5-methoxy-2-chloro-1-[4'.6'-bis-phenyl - 1'.3'.5'-triazinyl-(2')-amino]-benzene,
4-amino-2.5-dimethoxy-1-[4'.6'-bis-(N-ethyl)-phenylamino-1'.3'.5'-triazinyl-(2')-amino]-benzene,
4 - amino-2.5-dibenzyloxy-1-[4'.6'-bis-phenyl-1'.3'.5' - triazinyl-(2')-amino]-benzene,
4 - amino-2.5-dibenzyloxy-1-[4'.6'-bis-(2'' - chlorophenylamino)-1'.3'.5'-triazinyl-(2')-amino]-benzene.
4 - amino-1-[4'.6'-bis-morpholino-1'.3'.5'-triazinyl - (2')-amino]-benzene,
4-amino-2.5-dimethoxy-1-[4'.6'-bis-morpholino - 1'.3'.5'-triazinyl-(2')-amino]-benzene,
4-amino-2.5-dimethoxy-1-[4'.6'-bis-piperidino-1'.3'.5' - triazinyl-(2')-amino]-benzene.

Only a few of these N-triazinyl-p-phenylendiamines have been known up to now. The compounds can be produced for example according to the methods described below. 2-chloro-1.3.5-triazine compounds substituted in the 4- and 6-positions are condensed in an aqueous organic solvent in the presence of acid binding agents and at temperatures of 50–100°, with 4-acylamino-5-alkoxy-1-amino-benzenes which are possibly substituted in the 2-position by alkoxy groups. The acylamino group is then saponified in mineral acid solution. Advantageously triazinyl-p-phenylendiamines of the general Formula I which are substituted in the 4- and 6-positions of the triazinyl radical by secondary or tertiary amino groups are produced as follows: one mol of the 4-acetylamino-5-alkoxy-1-aminobenzene possibly substituted in the 2-position is condensed in the presence of sodium carbonate, in aqueous dioxane at 0° with one mol of cyanuric chloride. The two other chlorine atoms are then exchanged for substituted amino groups by heating the dichlorotriazinyl compound with two mols of a primary or secondary amine at 80–100°, advantageously also in aqueous dioxane and in the presence of sodium carbonate. Also excess amine can be used instead of the sodium carbonate as acid binding agent. It is also possible to exchange the second and third chlorine atom of the cyanuric chloride by proceeding in steps by, for example, first heating to 20–40° and then at 70–100° and possibly using different amino compounds in both steps. Finally the acetylamino group is again reconverted into the primary amino group. Monotriazinyl-p-phenylendiamines which do not contain an alkoxy group in the o-position to the primary amino group of the p-phenylene radical used according to the present invention can also be produced in the same way by using 4-acylamino-1-aminobenzenes which are possibly substituted by alkoxy groups in the 2-position.

The triazinyl-p-phenylendiamines used according to the present invention are condensed with chloranil and the ring is closed to form the dioxazine compounds by the usual known methods. It is of advantage to perform the condensation of the compounds of the general Formula I with chloranil in an inert organic solvent at medium temperatures and in the presence of acid binding agents. The chloranil condensation products are converted into the corresponding dioxazine compounds by heating in higher boiling organic solvents, advantageously in the presence of acid condensing agents which split ether or have an oxidising action such as halides of organic sulphonic and carboxylic acids or metal chlorides. Examples of suitable condensing agents are benzene or toluene sulphonic acid chlorides, ω-halogen alkyl compounds such as benzotrichloride or, finally metal chlorides such as aluminium chloride. If those triazinyl-p-phenylendiamines are used which do not contain an alkoxy group in the o-position to the primary amino group in the phenylene radical, then the presence of an oxidising agent is necessary in the reaction to close the ring. Also the organic solvents or the acid condensing agent used for closing the ring can be used as such. The reaction is performed for example in aromatic nitrated hydrocarbons or with aromatic sulphonic acid chlorides.

The new dioxazine dyestuffs are isolated and purified by methods known per se. Often the unsulphonated dioxazine compounds crystallise out in good yields just on cooling the reaction mixture. On recrystallising from high boiling, chlorinated and/or nitrated hydrocarbons they are obtained in the form of pure deep coloured crystals.

The dioxazine dyestuffs according to the present invention are used advantageously in a finely dispersed form. To obtain such a form they are dissolved in either organic or inorganic acids and precipitated with water or intensively milled, in particular in the presence of inorganic or organic salts the grains of which are harder than the dioxazine pigments. Advantageously small amounts of solid or liquid organic solvents are also added as additional milling agents to the milling mixture and in this way, soft grained pigments of good colour strength are obtained. Xylenes, naphthalene, tetrachlorethane and cyclohexane for example can be used as additional milling agents.

The pigment dyestuffs according to the present invention can be used for pigmenting rubber, varnishes, lacquers and synthetic materials in pure violet-blue, violet to bluish red shades. In addition to a remarkable fastness to migration and cross-lacquering and very good fastness to light, these colourings also have good to very good fastness to solvents and oil. The new pigment dyestuffs can also be used for colouring paper and viscose or acetyl cellulose in the mass, and moulded resins and thermoplastic masses. They can also be used in pigment printing pastes for textiles or paper as well as in paints. In addition, they are suitable for shading phthalocyanine pigments.

The following examples illustrate the invention without limiting it in any way. In these examples, parts are given as parts by weight unless otherwise stated, and the temperatures are in degrees centigrade. The relationship of parts by weight to parts by volume is as that of kilogrammes to litres.

*Example 1*

39.9 parts of 4-amino-2.5-dimethoxy-1-[4'.6'-bis-phenyl-1'.3'.5'-triazinyl-(2')-amino]-benzene, 12.3 parts of chloranil and 13.6 parts of crystallised sodium acetate are boiled under reflux in 400 parts of alcohol for 12 hours while stirring. The precipitate formed is filtered off, washed with alcohol and water and dried. 42 parts of a condensation product are obtained. This condensation product is converted into the dioxazine compound by heating it for 3 hours at 190° in 450 parts of nitrobenzene, the methyl alcohol being distilled off. The black-violet crystalline precipitate is filtered off at 100° and washed with alcohol and acetone. In this way 35 parts of a dioxazine dyestuff pigment are isolated. The pigment is finely distributed by milling with dehydrated calcium chloride in the presence of small amounts of xylene. It can be ground into a printing paste with linseed oil and aluminium hydroxide which produces pure violet prints on paper having very good fastness to light. In polyvinyl chloride colourings this pigment has excellent fastness to migration and heat. On mixing one part of this dioxazine pigment with one part of copper phthalocyanine, a pigment dyestuff mixture is obtained which produces valuable deep blue shades of very good fastness on pigmenting lacquers.

If in the above process instead of the 4-amino-2.5-dimethoxy-1-[4'.6'-bis-phenyl-1'.3'.5' - triazinyl - (2') - amino]-benzene, 42.7 parts of 4-amino-2.5-diethoxy-1-[4'.6'-bis-phenyl-1'.3'.5'-triazinyl-(2')-amino]-benzene are used, then a pigment is obtained which produces blue prints on paper of similar good fastness.

*Example 2*

33.9 parts of 4-amino-1-[4'.6'-bisphenyl-1'.3'.5'-triazinyl-(2')-amino]-benzene, 13 parts of chloranil and 14 parts of crystallised sodium acetate are boiled under reflux in 500 parts of alcohol for 8 hours. The precipitate formed is filtered off under suction, washed with alcohol and water and dried. 38 parts of a brown product are obtained. This is heated in 400 parts of nitrobenzene with 20 parts of benzene sulphochloride for 4 hours at 180°. After cooling, the condensation product is filtered off and washed with alcohol and acetone. The yield is 30 parts. After milling to form a finely dispersed powder, lithographic printing pastes can be produced therefrom with which Bordeaux red shades of very good fastness to light are obtained. The starting product used in this example can be produced by condensing the 2.4-bis-phenyl-6-chlorotriazine with 4-amino-acetanilide and subsequently saponifying in alcoholic hydrochloric acid.

If in the above process the 4-amino-1-[4'.6'-bis-phenyl-1'.3'.5'-triazinyl-(2')-amino]-benzene is replaced by 35.7 parts of 4-amino-1-[4'.6'-bis-morpholino-1'.3'.5'-triazinyl-(2')-amino]-benzene, produced by condensing 4-amino-acetanilide with cyanuric chloride in aqueous acetone at 0° in the presence of sodium carbonate, further condensing the resultant 4-acetylamino-1-[4'.6'-dichloro-1'.3'.5'-triazinyl-(2')-amino]-benzene with morpholine in dioxane at 80–90° and subsequently saponifying the acetylamino group in alcoholic hydrochloric acid, then a pigment is obtained with which reddish violet lithographic prints of very good fastness to light can be obtained.

Example 3

49.8 parts of 4-amino-2.5-dimethoxy-1-[4'.6'-bis-(2'-chlorophenylamino)-1'.3'.5' - triazinyl-(2')-amino] - benzene, 12.3 parts of chloranil and 14.6 parts of crystallised sodium acetate are boiled under reflux for 10 hours in 500 parts of alcohol. The crystalline precipitate formed is filtered off, washed with alcohol and water and dried. It is then heated in 500 parts of nitrobenzene with 50 parts of benzoyl chloride for 4 hours at 180°. After cooling, the condensation product is filtered off and washed with alcohol and acetone. The yield is 40 parts. After processing this dyestuff pigment in polyvinyl chloride, pure fast to light red-violet shades are obtained which have very good fastness to migration and heat.

Under the same conditions, the corresponding 3"- and 4"-chlorophenylamino derivatives as well as 4-amino-2.5-dimethoxy-1-[4'.6' - bis - (2".4"-dichlorophenylamino)-1'.3'.5'-triazinyl-(2')-amino]-benzene produce pigments having similar good properties.

The amines used in this example are obtained for example by condensing the 4-acetylamino-2.5-dimethoxy-1-[4'.6'-dichloro-1'.3'.5'-triazinyl-(2')-amino] - benzene produced from 4-acetylamino-2.5-dimethoxyaminobenzene and cyanuric chloride, with the corresponding chloranilines and subsequently saponifying the acetylamino group. If in this example 4-amino-2.5-dimethoxy-1-[4'.6'-bis - morpholino - 1'.3'.5' - triazinyl - (2')-amino]-benzene, produced by condensing 4-acetylamino-2.5-di-

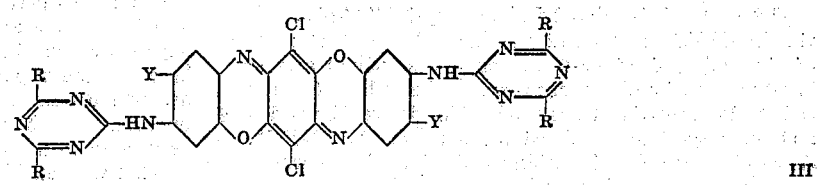

| No. | Y | R | I | II | III |
|---|---|---|---|---|---|
| 1 | H | HN—⬡ | Violet | Blue | Reddish violet. |
| 2 | H | HN—⬡—Cl | Reddish violet | Deep blue | Red. |
| 3 | OCH₃ | HN—n—C₄H₉ | Violet | Black-blue | Deep blue. |
| 4 | OCH₃ | HN—C₁₆H₃₃ | do | Green-grey | Blue. |
| 5 | OCH₃ | HN—⬡—Cl | Red violet | Black-violet | Do. |
| 6 | OCH₃ | HN—⬡(Cl)—Cl | do | do | Reddish blue. |
| 7 | OCH₃ | HN—⬡—CH₃ | Reddish violet | Violet | Deep blue. |
| 8 | OCH₃ | HN—⬡(CH₃) | Blue | do | Do. |
| 9 | OCH₃ | HN—⬡—CH₃ | Violet | do | Blue-violet. |
| 10 | OCH₃ | N⬡H (pyridyl) | do | Black | Blue. |
| 11 | OCH₃ | N(n—C₃H₇)₂ | do | Violet | Deep blue. |
| 12 | OCH₃ | N(n—C₄H₉)₂ | do | do | Do. |
| 13 | OC₄H₉ | HN—⬡—Cl | do | Black-violet | Blue. |
| 14 | OCH₂C₆H₅ | HN—⬡ | do | Violet | Deep blue. |
| 15 | OCH₂C₆H₅ | HN—⬡—Cl | do | do | Do. |
| 16 | OCH₂—⬡—Cl | HN—⬡—Cl | do | Black-violet | Do. | methoxy-1-[4'.6'-dichloro - 1'.3'.5' - triazinyl - (2') - amino]-benzene with morpholine in hot dioxane, is used as starting amine, then a violet-blue dioxazine pigment having very good fastness properties is obtained.

Finally, if 4-amino - 2.5 - dimethoxy-1-[4'.-(2''-chlorophenylamino) - 6' - (4'''-methoxy-phenylamino)-1'.3'.5'-triazinyl-(2')-amino]-benzene, produced by condensing 4-acetylamino - 2.5 - dimethoxy - 1 - [4'.6'-dichloro-1'.3'.5'-triazinyl-(2')-amino]-benzene with 2-chloraniline in aqueous dioxan in the presence of sodium carbonate at 40°, is used as starting product, then with 4-methoxyaniline under otherwise the same conditions at 95°, a violet pigment is obtained which has very good fastness properties.

Example 4

42.9 parts of 4-amino-2.5-dimethoxy-1-[4'.6'-bis-phenylamino-1'.3'.5'-triazinyl-(2')-amino] - benzene, 15 parts of chloranil and 10 parts of anhydrous sodium acetate in 500 parts of o-dichlorobenzene are heated for 6 hours at 70°; 25 parts of benzene sulphochloride are then added and the suspension is stirred for 5 hours at 170–175°. After filtering off and washing with alcohol and water, a deeply coloured pigment is obtained with which pure violet lithographic prints can be produced.

In the foregoing table the shades which can be produced on paper with a printing paste produced by grinding a finely dispersed dioxazine dyestuff pigment of the Formula III with linseed oil and aluminium hydroxide, are given in column I. Column II gives the colour of the solution of the dioxazine compound in concentrated sulphuric acid and column III gives the colour in boiling nitrobenzene.

Example 5

4 parts of the dioxazine pigment produced according to Example 2 from 4-amino-1-[4'.6'-bis-phenyl-1'.3'.5'-triazinyl-(2')-amino]-benzene are mixed and ground on a three roll will with 36 parts of aluminium hydroxide, 60 parts of linseed oil varnish of medium viscosity and 0.2 part of cobaltous linoleate. A graphic colour is obtained which produces bluish-red prints which have very good fastness to light.

Example 6

10 parts of the dioxazine dyestuff pigment obtained according to Example 3 from 4-amino-2.5-dimethoxy-1-[4'.6' - bis - morpholino - 1'.3'.5'-triazinyl-(2')-amino]-benbene are milled for 48 hours in a ball mill with 10 parts of titanium dioxide, 35 parts of a 60% solution of a modified urea-alkyd resin in xylene/butanol 1:1, 10 parts of turpentine and 5 parts of xylene. If this lacquer is poured onto aluminium foils and fixed by stoving for 1 hour at 120°, then deep blue dyeings of excellent fastness to heat, cross lacquering and light are obtained.

Example 7

67 parts of polyvinyl chloride, 33 parts of dioctyl phthalate, 0.6 part of the dioxazine dyestuff pigment produced according to Example 1 from 4-amino-2.5-dimethoxy-1-[4'.6'-bis-phenyl-1'.3'.5'-triazinyl - (2') - amino]-benzene, and 2 parts of titanium dioxide are mixed together and treated for 10–15 minutes at 140° on a rolling mill. Violet coloured polyvinyl chloride foils having very good fastness to migration and light are obtained.

What we claim is:

1. An unsulphonated dioxazine pigment which corresponds to the general formula:

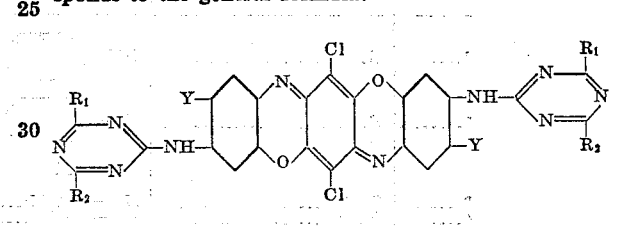

wherein Y represents a member selected from the group consisting of hydrogen and lower alkoxy and benzyloxy radicals, and $R_1$ and $R_2$ each represent a member selected from the group consisting of phenyl, alkylamino with up to 18 carbon atoms, N.N-di(lower)alkylamino, phenylamino, morpholino and piperidino radicals.

2. A dioxazine pigment corresponding to the formula:

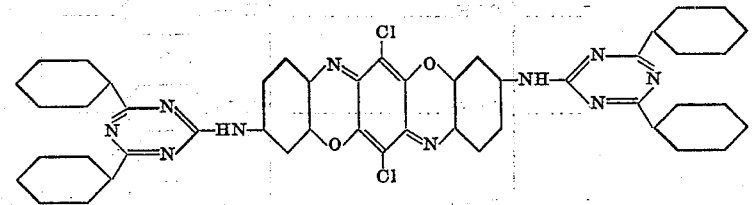

3. A dioxazine pigment corresponding to the formula:

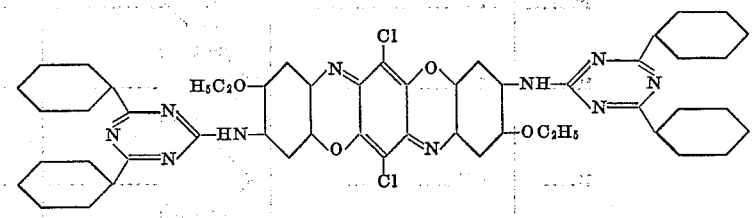

4. A dioxazine pigment corresponding to the formula:

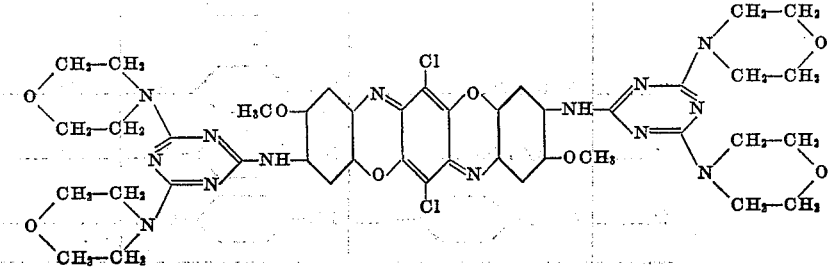

5. A dioxazine pigment corresponding to the formula:
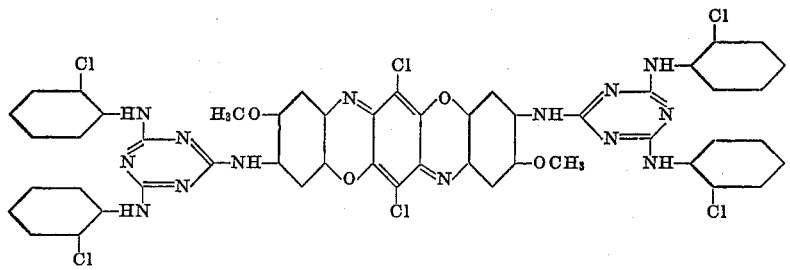
6. A dioxazine pigment corresponding to the formula:
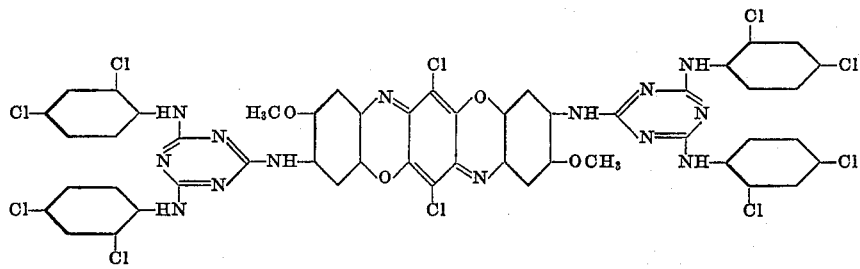
References Cited in the file of this patent
UNITED STATES PATENTS
2,845,423   Anderson _____ July 29, 1958
OTHER REFERENCES
Fierz-David et al.: Helv. Chim. Acta, vol. 22, pp. 1348–58 (1939).